United States Patent
Sung et al.

(10) Patent No.: US 10,770,718 B2
(45) Date of Patent: Sep. 8, 2020

(54) LITHIUM-SULFUR SECONDARY BATTERY

(71) Applicants: Seoul National University R&DB Foundation, Gwanak-gu, Seoul (KR); Institute For Basic Science, Yuseong-gu, Daejeon (KR)

(72) Inventors: Yung-Eun Sung, Seoul (KR); Chunjoong Kim, Daejeon (KR); Jungjin Park, Seoul (KR)

(73) Assignees: Seoul National University R&DB Foundation, Seoul (KR); Institute For Basic Science, Yuseong-gu, Daejeon (KR)

( * ) Notice: Subject to any disclaimer, the term of this patent is extended or adjusted under 35 U.S.C. 154(b) by 207 days.

(21) Appl. No.: 15/913,687

(22) Filed: Mar. 6, 2018

(65) Prior Publication Data

US 2018/0301694 A1  Oct. 18, 2018

(30) Foreign Application Priority Data

Apr. 12, 2017  (KR) .................. 10-2017-0047592

(51) Int. Cl.
| | |
|---|---|
| *H01M 4/136* | (2010.01) |
| *H01M 4/58* | (2010.01) |
| *H01M 4/62* | (2006.01) |
| *H01M 4/36* | (2006.01) |
| *H01M 4/80* | (2006.01) |
| *H01M 4/66* | (2006.01) |

(Continued)

(52) U.S. Cl.
CPC .......... *H01M 4/136* (2013.01); *H01M 4/362* (2013.01); *H01M 4/364* (2013.01); *H01M 4/5815* (2013.01); *H01M 4/62* (2013.01); *H01M 4/625* (2013.01); *H01M 4/661* (2013.01); *H01M 4/663* (2013.01); *H01M 4/667* (2013.01); *H01M 4/806* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2016/0218342 A1* | 7/2016 | Xiao | H01M 2/145 |
| 2017/0207448 A1* | 7/2017 | Fanous | H01M 4/136 |
| 2018/0277894 A1* | 9/2018 | Pan | H01M 10/058 |

FOREIGN PATENT DOCUMENTS

KR  2015-0061680 A  6/2015

OTHER PUBLICATIONS

Yuan et al., "Powering Lithium-Sulfur Battery Performance by Propelling Polysulfide Redox at Sulfiphilic Hosts", Nano Lett. 2016, 519-527 (Year: 2016).*

(Continued)

*Primary Examiner* — Carmen V Lyles-Irving
(74) *Attorney, Agent, or Firm* — Kilpatrick Townsend & Stockton LLP

(57) ABSTRACT

A lithium-sulfur secondary battery includes a cathode current collector and a cathode electrode on the cathode current collector. The cathode electrode includes a porous carbon interlayer electrode including a plurality of carbon fibers, metal sulfide catalyst particles dispersed and positioned on the porous carbon interlayer electrode, and sulfur-based active material particles dispersed on the porous carbon interlayer electrode to be attached thereto and including sulfur.

11 Claims, 12 Drawing Sheets

(51) Int. Cl.
*H01M 10/052* (2010.01)
*H01M 4/02* (2006.01)

(56) References Cited

OTHER PUBLICATIONS

Jungjin Park, et al., Advanced Energy Material., Supporting Information, Weinheim, Germany, 2017.
Jungjin Park, et al., Tungsten Disulfide Catalysts Supported on a Carbon Cloth Interlayer for High Performance Li—S Battery, Advanced Energy Materials 2017, 1602567, Jan. 16, 2017.
T. Lei et al., "Multi-Functional Layered WS2 Nanosheets for Enhancing the Performance of Lithium-Sulfur Batteries", Adv. Energy Mater. 2017, 7, 1601843 (Oct. 28, 2016).
KR Patent Application No. 1020170047592 filed Apr. 12, 2017 Office Action dated Apr. 24, 2018, all pages.

* cited by examiner

LITHIUM-SULFUR SECONDARY BATTERY

CROSS-REFERENCE TO RELATED APPLICATION

This application claims the benefit of Korean Patent Application No. 10-2017-0047592, filed on Apr. 12, 2017, in the Korean Intellectual Property Office, the disclosure of which is incorporated herein in its entirety by reference.

BACKGROUND

1. Field

One or more embodiments relate to a lithium-sulfur secondary battery, and more particularly, to a lithium-sulfur secondary battery including a sulfur-based cathode active material.

2. Description of the Related Art

Sulfur-based cathode active materials have a high theoretical capacity, e.g., about 1,675 mAh/g and are inexpensive, and thus lithium-sulfur batteries are attracting attention as batteries capable of replacing lithium ion batteries. However, lithium polysulfide ($Li_2S_x$), which is an intermediate product produced by a reaction between sulfur and lithium, is soluble in an electrolyte including an organic solvent, and thus has high initial irreversible capacity due to dissolution of a cathode active material in an electrolyte, or poor capacity retention properties due to low electrical conductivity thereof.

SUMMARY

One or more embodiments include a lithium-sulfur battery with excellent capacity retention characteristics.

Additional aspects will be set forth in part in the description which follows and, in part, will be apparent from the description, or may be learned by practice of the presented embodiments.

According to one or more embodiments, a lithium-sulfur secondary battery includes a cathode current collector; and a cathode electrode on the cathode current collector. The cathode electrode includes: a porous carbon interlayer electrode including a plurality of carbon fibers, metal sulfide catalyst particles dispersed and positioned on the porous carbon interlayer electrode, and sulfur-based active material particles dispersed on the porous carbon interlayer electrode to be attached thereto and including sulfur.

In example embodiments, the metal sulfide catalyst particles may include at least one selected from the group consisting of tungsten disulfide ($WS_2$), molybdenum sulfide ($MoS_2$), cobalt sulfide ($CoS_2$), titanium sulfide ($TiS_2$), iron sulfide ($FeS_2$), and nickel sulfide ($NiS_2$).

In example embodiments, the metal sulfide catalyst particles may include tungsten disulfide ($WS_2$).

In example embodiments, the metal sulfide catalyst particles may have sulfiphilic surfaces.

In example embodiments, the porous carbon interlayer electrode may include at least one selected from the group consisting of carbon fiber fabric, carbon fiber cloth, and carbon non-woven fabric.

In example embodiments, the metal sulfide catalyst particles may have an average diameter of about 1 nm to about 100 μm.

In example embodiments, the sulfur-based active material particles may have an average diameter of 100 nm to 10 μm.

In example embodiments, the sulfur-based active material particles may contact at least one of the porous carbon interlayer electrode and the metal sulfide catalyst particles.

In example embodiments, the metal sulfide catalyst particles may prevent irreversible dissolution of the sulfur-based active material particles from the cathode electrode.

In example embodiments, the cathode electrode may further include: a cathode active material sheet located between the porous carbon interlayer electrode and the cathode current collector, and including sulfur-based active material particles including sulfur, a binder, and a conductive material.

According to one or more embodiments, a lithium-sulfur secondary battery includes: a cathode current collector; and a cathode electrode on the cathode current collector. The cathode electrode comprises: a cathode active material sheet including sulfur-based active material particles including sulfur, a binder, and a conductive material, a porous carbon interlayer electrode including a plurality of carbon fibers, and metal sulfide catalyst particles dispersed and positioned on the porous carbon interlayer electrode.

In example embodiments, the metal sulfide catalyst particles are also dispersed and positioned on the cathode active material sheet.

In example embodiments, the cathode active material sheet is located between the porous carbon interlayer electrode and the cathode current collector.

In example embodiments, the metal sulfide catalyst particles have sulfiphilic surfaces.

In example embodiments, the metal sulfide catalyst particles prevent irreversible dissolution of the sulfur-based active material particles from the cathode electrode.

According to one or more embodiments, a lithium-sulfur secondary battery includes: a cathode current collector; a cathode electrode on the cathode current collector; an anode current collector; an anode electrode positioned on the anode current collector and including lithium; a separator located between the anode electrode and the cathode electrode; and an electrolyte allowing the separator to be immersed therein and being in contact with a surface of the cathode electrode. The cathode electrode includes: a carbon interlayer electrode including a plurality of carbon fibers, metal sulfide catalyst particles dispersed and positioned on the carbon interlayer electrode and including tungsten, and sulfur-based active material particles dispersed on the carbon interlayer electrode to be attached thereto In example embodiments, the metal sulfide catalyst particles include tungsten disulfide ($WS_2$), and the metal sulfide catalyst particles have sulfiphilic surfaces.

In example embodiments, the metal sulfide catalyst particles prevent the sulfur-based active material particles from being dissolved in the electrolyte from the cathode electrode.

In example embodiments, the metal sulfide catalyst particles have an average diameter of 1 nm to 100 μm.

In example embodiments, the metal sulfide catalyst particles have an average diameter within a range selected from about 1 nm to about 10 nm, about 10 nm to about 200 nm, about 100 nm to about 1 μm, and about 1 μm to about 100 μm.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
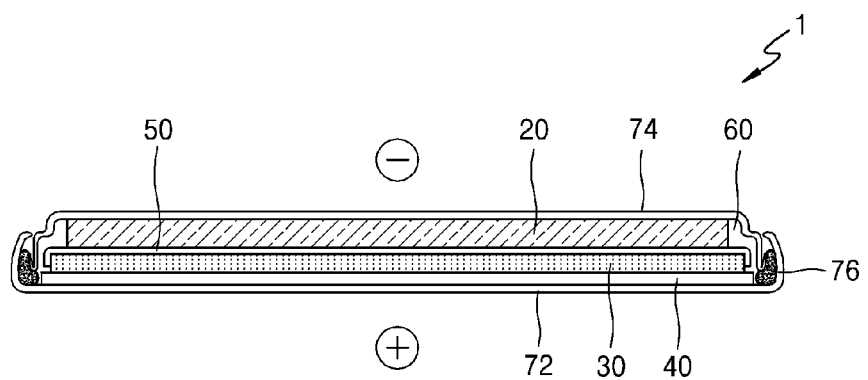
FIG. 1 is a cross-sectional view of a lithium-sulfur battery according to example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Example embodiments will now be described with reference to the accompanying drawings to fully understand configurations and effects of the present disclosure. However, the present disclosure should not be construed as being limited to embodiments set forth herein and may be embodied in many different forms and variously modified. Rather, these embodiments will be described so that this disclosure will be thorough and complete, and will fully convey the scope of the present disclosure to those of ordinary skill in the art. In the accompanying drawings, the sizes of elements are exaggerated for clarity of explanation, and each element may be enlarged or reduced.

It will be understood that, when an element is referred to as being "on" or "into contact with" another element, it can directly contact the other element or be connected thereto or intervening elements may be present therebetween. In contrast, it will be understood that, when an element is referred to as being "directly on" of "directly into contact with" another element, there are no intervening elements present. Other expressions used to explain the relationship between elements, for example, "between," "directly between," and the like may be interpreted in the same way.

Terms such as "first," "second," and the like may be used to describe various elements, but the elements should not be limited by these terms. The terms may be used only to distinguish one element from another. For example, the first element may be denoted as the second element, and similarly, the second element may also be denoted as the first element without departing from the scope of the present disclosure.

An expression used in the singular encompasses the expression of the plural, unless context clearly indicates otherwise. It is to be understood that the term such as "including," "having," or the like is intended to indicate the existence of features, numbers, steps, operations, components, parts, or combinations thereof disclosed in the specification, and it may be interpreted that one or more other features, numbers, steps, operations, components, parts, or combinations thereof may be added.

Unless defined otherwise, all terms used in embodiments may be interpreted as meanings obvious to those of ordinary skill in the art.

Hereinafter, example embodiments of the present disclosure will be described with reference to the accompanying drawings.

FIG. 1 is a cross-sectional view of a lithium-sulfur battery 1 according to example embodiments.

Referring to FIG. 1, the lithium-sulfur battery 1 may include an anode electrode 20, a cathode electrode 30, a cathode current collector 40, a separator 50, an electrolyte 60, cases, i.e., lower and upper cases 72 and 74, and a sealing member 76. The lithium-sulfur battery 1 may be a lithium secondary battery using lithium as a charge transfer medium. The cathode electrode 30 may be attached to the cathode current collector 40, and the separator 50 may be positioned between the cathode electrode 30 and the anode electrode 20. The anode electrode 20, the cathode electrode 30, and the separator 50 may be accommodated in the lower and upper cases 72 and 74 impregnated with the electrolyte 60. The lower and upper cases 72 and 74 may be fixed by the sealing member 76 in such a way that the lower case 72 is not electrically connected to the upper case 74. The cathode electrode 30 is electrically connected to the lower case 72, and the anode electrode is electrically connected to the upper case 74, and thus the upper case 74 and the lower case 72 may act as electrical terminals of the lithium-sulfur battery 1.

The anode electrode 20 may include lithium metal, graphite, a silicon-based material, a tin-based material, a mixture thereof, or the like. When the anode electrode 20 includes lithium metal, the anode electrode 20 may be formed as a single layer as illustrated in FIG. 1. However, when the anode electrode 20 includes graphite, a silicon-based material, a tin-based material, a mixture thereof, or the like, the anode electrode 20 may be attached to an anode current collector (not shown) made of, for example, copper foil or the like.

The cathode electrode 30 may include a porous carbon interlayer electrode, metal sulfide catalyst particles, and sulfur-based active material particles. The cathode electrode 30 may be attached to the cathode current collector 40 made of, for example, aluminum foil, nickel foil, or an alloy thereof. Hereinafter, the cathode electrode 30 will be described in detail with reference to FIG. 2.

The separator 50 may have porosity and may be formed as a single layer or a multilayer including two or more layers. The separator 50 may include a polymer material, and may include, for example, at least one of polyethylenes, polypropylenes, polyvinylidene fluorides, polyolefin-based polymers, and the like.

The electrolyte 60 may include a non-aqueous solvent and an electrolyte salt. The non-aqueous solvent is not particularly limited as long as the solvent is used as a non-aqueous solvent for general non-aqueous electrolytes, and examples thereof include carbonate-based solvents, ester-based solvents, ether-based solvents, ketone-based solvents, alcohol-based solvents, or aprotic solvents. The aprotic solvents may be used alone or a mixture of two or more of these aprotic solvents may be used, and, in the case of the mixture of two or more of these aprotic solvents, a mixing ratio may be appropriately adjusted according to desired battery performance.

The electrolyte salt is not particularly limited so long as the salt is used as an electrolyte salt for general non-aqueous electrolytes, and may be, for example, a salt having a structural formula of $A^+B^-$. In the formula, $A^+$ may be an alkali metal cation such as $Li^+$, $Na^+$, $K^+$, or the like, or an ion containing a combination thereof. In addition, $B^-$ may be an anion such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2$, $C(CF_2SO_2)_3^-$, or the like, or an ion containing a combination thereof. For example, the electrolyte salt may be a lithium-based salt, and may include, for example, at least one selected from the group consisting of $LiPF_6$, $LiBF_4$, $LiSbF_6$, $LiAsF_6$, $LiN(SO_2C_2F_6)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, and $LiB(C_2O_4)_2$. These electrolyte salts may be used alone or a mixture of two or more of these electrolyte salts may be used.

Although FIG. 1 illustrates the lithium-sulfur battery 1 as an example of a coin-type battery, the technical spirit of the present disclosure is not limited thereto. Unlike what is illustrated in FIG. 1, the lithium-sulfur battery 1 may be a cylindrical-type battery in which a cathode electrode and an anode electrode are accommodated in a spirally wound form in a case having a cylindrical shape, or a rectangular-type battery in which a cathode electrode and an anode electrode are wound and accommodated in a case having a rectangular shape. Unlike these, the lithium-sulfur battery 1 may be a polymer battery in which a plurality of cathode electrodes and a plurality of anode electrodes are stacked one upon another and accommodated in a plastic pouch.

Figure 2:
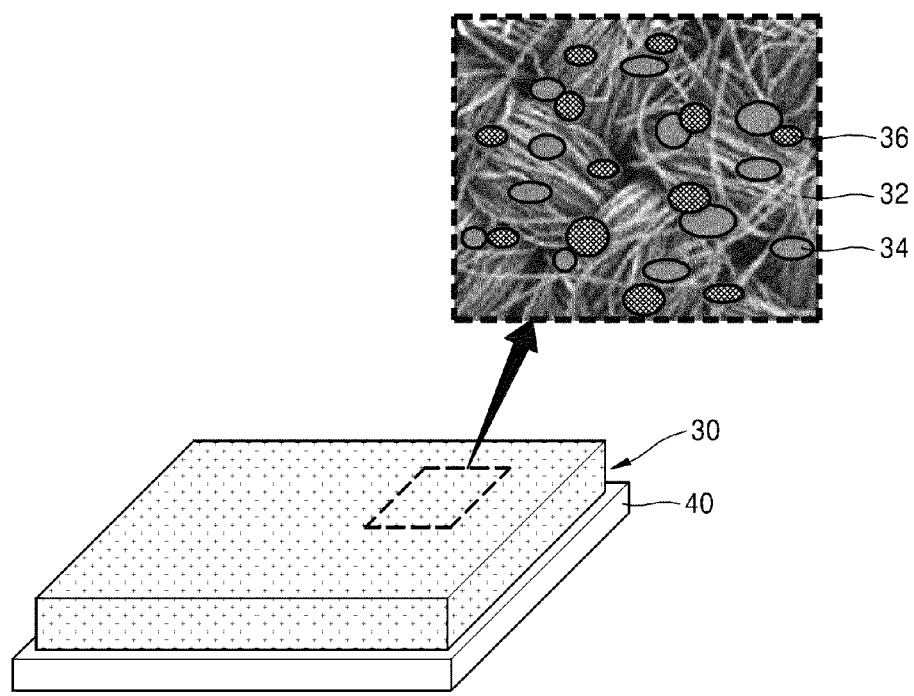
FIG. 2 is a schematic view illustrating a cathode electrode included in a lithium-sulfur battery according to example embodiments.

FIG. 2 is a schematic view illustrating the cathode electrode 30 included in the lithium-sulfur battery 1 according to example embodiments.

Referring to FIG. 2, the cathode electrode 30 may be attached to the cathode current collector 40. The cathode electrode 30 may include a porous carbon interlayer electrode 32, metal sulfide catalyst particles 34 dispersed and positioned on the porous carbon interlayer electrode 32, and cathode active material particles 36 dispersed and positioned on the porous carbon interlayer electrode 32.

In example embodiments, the porous carbon interlayer electrode 32 may include a plurality of carbon fibers. For example, the porous carbon interlayer electrode 32 may be carbon fiber fabric or carbon fiber cloth in which a plurality of carbon fibers are in the form of fabric. In addition, the porous carbon interlayer electrode 32 may be carbon non-woven fabric formed such that a plurality of carbon fibers are compressed to include fine pores. However, the type of the porous carbon interlayer electrode 32 is not limited to the above examples.

The porous carbon interlayer electrode 32 may have a relatively wide surface area and high porosity, and thus the cathode active material particles 36 and the metal sulfide catalyst particles 34 may be uniformly dispersed on and attached to a surface of the porous carbon interlayer electrode 32. In addition, since the porous carbon interlayer electrode 32 has high electrical conductivity, electrons generated through an electrochemical reaction of the cathode active material particles 36 on the surface of the porous carbon interlayer electrode 32 may be rapidly transferred to the cathode current collector 40.

The metal sulfide catalyst particles 34 may be dispersed and located on the porous carbon interlayer electrode 32. The metal sulfide catalyst particles 34 may have high adhesion to the porous carbon interlayer electrode 32 and high adhesion to the cathode active material particles 36 that contain sulfur. Accordingly, in charging or discharging of the lithium-sulfur battery 1, the cathode active material particles 36 that contain sulfur may act as a barrier that prevents the cathode active material particles 36 from being dissolved in the electrolyte 60 and thus from being separated from the porous carbon interlayer electrode 32.

In example embodiments, the metal sulfide catalyst particles 34 may include, for example, a metal disulfide such as tungsten disulfide ($WS_2$), molybdenum disulfide ($MoS_2$), cobalt disulfide ($CoS_2$), titanium disulfide ($TiS_2$), iron disulfide ($FeS_2$), nickel disulfide ($NiS_2$), or the like. For example, in the present embodiment, the metal sulfide catalyst particles 34 may include tungsten disulfide ($WS_2$).

The metal sulfide catalyst particles 34 may have sulfiphilic surfaces. Thus, the metal sulfide catalyst particles 34 may exhibit high adsorption properties with respect to the cathode active material particles 36 that contain sulfur. For example, when the metal sulfide catalyst particles 34 are formed of tungsten disulfide ($WS_2$), the tungsten disulfide may have a layered structure, and edge sites of the layered structure of the tungsten disulfide may have sulfiphilic properties. Accordingly, lithium polysulfide, which is an intermediate product produced by a reaction between sulfur and lithium, may be effectively adsorbed onto the edge sites of tungsten disulfide particles.

In example embodiments, the metal sulfide catalyst particles 34 may have an average size (or average diameter) of about 1 nm to about 100 μm. For example, the average size of the metal sulfide catalyst particles 34 may range from about 1 nm to about 10 nm, from about 10 nm to about 200 nm, from about 100 nm to about 1 μm, or from about 1 μm to about 100 μm. However, average size distribution of the metal sulfide catalyst particles 34 is not limited to the above-described ranges. The average size of the metal sulfide catalyst particles 34 may be appropriately selected according to the type and capacity of the lithium-sulfur battery 1, desired characteristics of the lithium-sulfur battery 1, and the like. For example, when the size of the metal sulfide catalyst particles 34 is too small, it may be difficult to sufficiently adsorb the cathode active material particles 36. When the size of the metal sulfide catalyst particles 34 is too large, it may be difficult to uniformly disperse the metal sulfide catalyst particles 34 on the surface of the porous carbon interlayer electrode 32, and the amount of the cathode active material particles 36 that are loadable on the surface of the porous carbon interlayer electrode 32 may be limited, thus reducing the capacity of the cathode electrode 30.

The cathode active material particles 36 may be dispersed and located on the porous carbon interlayer electrode 32. The cathode active material particles 36 may be a sulfur-containing cathode active material. For example, the cathode active material particles 36 may be cyclic $S_8$ particles. In a discharged state of the lithium-sulfur battery 1, the oxidation reaction of lithium may occur in an anode electrode and the reduction reaction of sulfur may occur in a cathode electrode, and, for example, in the cathode electrode, the cathode active material particles 36 may be reduced from cyclic $S_8$ particles to be converted into linear lithium polysulfides ($Li_2S_x$, e.g., $Li_2S_8$, $Li_2S_6$, $Li_2S_4$, $Li_2S_2$, and $Li_2S$).

In example embodiments, the cathode active material particles 36 may have an average size (or average diameter) of about 100 nm to about 10 μm. The cathode active material particles 36 as well as the metal sulfide catalyst particles 34 may be uniformly dispersed on the porous carbon interlayer electrode 32. Thus, lithium polysulfide, which is an intermediate product produced by the reaction between sulfur and lithium, may be effectively adsorbed onto surfaces of the metal sulfide catalyst particles 34, and, accordingly, loss of the cathode active material particles 36, occurring due to dissolution of the lithium polysulfide in an electrolyte, may be prevented.

Although not shown in the drawings, the cathode electrode 30 may further include a conductive material (not shown) and a binder (not shown). For example, the conductive material and the binder may be mixed with the cathode active material particles 36 to be dispersed and located on the porous carbon interlayer electrode 32.

In example embodiments, the conductive material may further impart conductivity to the cathode electrode 30, and may be a conductive material that does not cause chemical changes in the lithium-sulfur battery 1. The conductive material may include, for example, conductive materials including: carbon-based materials such as graphite, carbon black, acetylene black, carbon fibers, and the like; metal-based materials such as copper, nickel, aluminum, silver, and the like; conductive polymer materials such as polyphenylene derivatives and the like; and mixtures thereof. The binder attaches the cathode active material particles 36 to one another, and also attaches the cathode active material particles 36 to the cathode current collector 40. The binder may be, for example, a polymer, and non-limiting examples of the binder include polyimides, polyamideimides, polybenzimidazole, polyvinyl alcohols, carboxymethylcellulose, hydroxypropylcellulose, polyvinylchloride, carboxylated polyvinylchloride, polyvinylfluoride, ethylene oxide, polyvinylpyrrolidone, polyurethane, polytetrafluoroethylene, polyvinylidene fluoride, polyethylene, polypropylene, styrene-butadiene, acrylated styrene-butadiene, and epoxy resins.

Hereinafter, an electrochemical reaction in charging and discharging of a lithium-sulfur battery will be schematically described with reference to FIG. 3.

Figure 3:
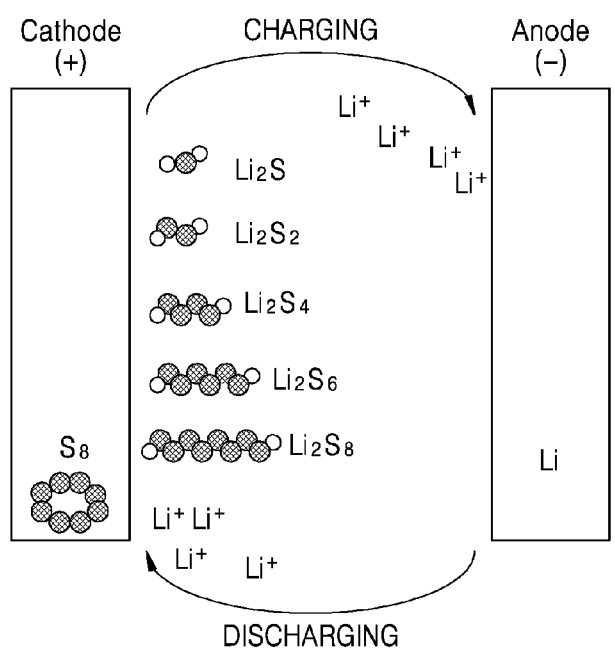
FIG. 3 is a schematic view illustrating an electrochemical reaction in charging and discharging processes of a lithium-sulfur battery according to example embodiments.

Referring to FIG. 3, in discharging of the lithium-sulfur battery 1, the oxidation reaction of lithium may occur in an anode electrode, and the reduction reaction of sulfur may occur in a cathode electrode.

In the discharged state of the lithium-sulfur battery 1, the oxidation reaction of lithium may occur in an anode electrode and the reduction reaction of sulfur may occur in a cathode electrode. For example, the cathode active material particles 36 may be reduced from cyclic $S_8$ particles (e.g., solid $S_8$ particles directly receive electrons or receive electrons via an electrolyte) to be converted into linear lithium polysulfides ($Li_2S_x$, for example, $Li_2S_8$, $Li_2S_6$, $Li_2S_4$, $Li_2S_2$, and $Li_2S$).

In the charged state of the lithium-sulfur battery 1, the reduction reaction of lithium may occur in an anode electrode and the oxidation reaction of sulfur may occur in a cathode electrode. For example, the cathode active material particles 36 may be converted into cyclic $S_8$ particles such that lithium polysulfide ($Li_2S_x$) particles including lithium sulfide ($Li_2S$) particles receive electrons.

Generally, lithium polysulfide particles have low electrical conductivity, and thus may have poor high rate characteristics. In addition, lithium polysulfide particles have a high solubility in an electrolyte, and thus, as charging and discharging processes are repeated, the lithium polysulfide particles are dissolved in the electrolyte, and thus are easily separated or peeled off from a cathode electrode. In this case, the amount of cathode active material particles attached to the cathode electrode may be reduced, and cycle characteristics of a lithium-sulfur battery may deteriorate.

However, according to the above-described cathode electrode 30, the metal sulfide catalyst particles 34 dispersed on the porous carbon interlayer electrode 32 may rapidly transfer electrons generated by the electrochemical reaction of the cathode active material particles 36 to the cathode current collector 40. In addition, the metal sulfide catalyst particles 34 having sulfiphilic surfaces may prevent lithium polysulfide from being dissolved in an electrolyte to be lost. Accordingly, the lithium-sulfur battery 1 including the cathode electrode 30 may have excellent high rate characteristics and excellent capacity retention characteristics.

Figure 4:
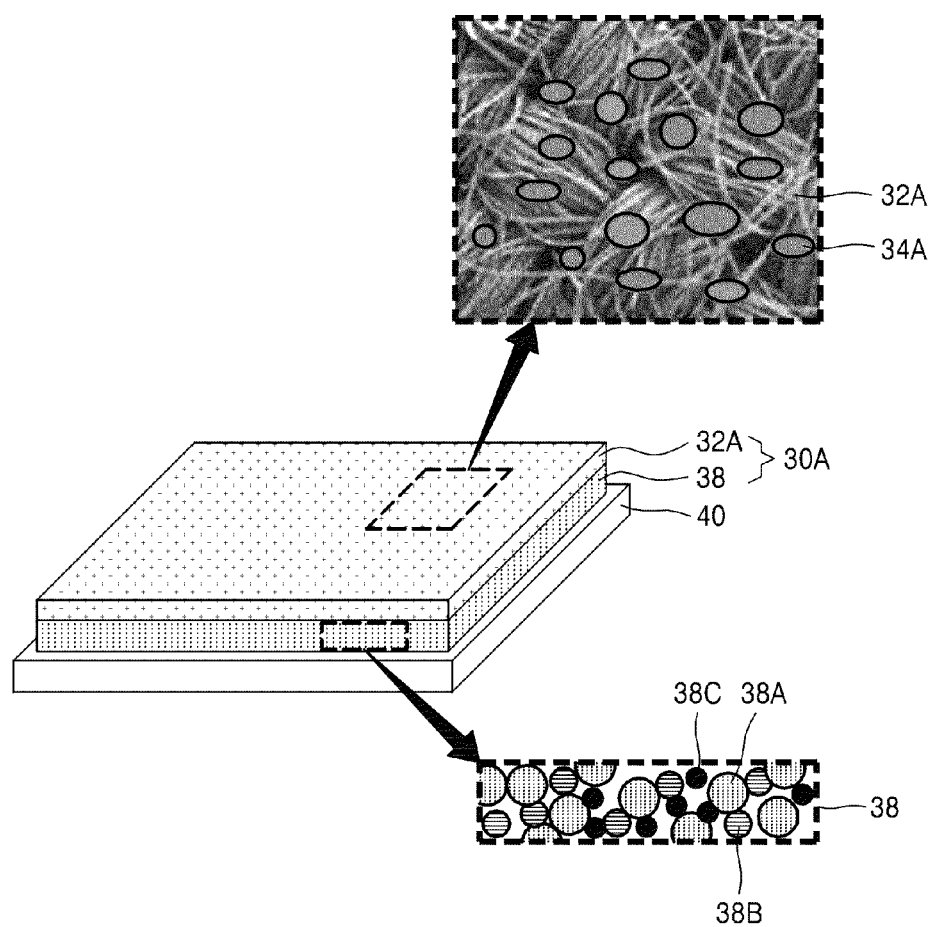
FIG. 4 is a schematic view illustrating a cathode electrode included in a lithium-sulfur battery according to example embodiments.

FIG. 4 is a schematic view illustrating a cathode electrode 30A included in a lithium-sulfur battery according to example embodiments. In FIG. 4, the same reference numerals as those in FIGS. 1 to 3 may denote like elements.

Referring to FIG. 4, the cathode electrode 30A may include a porous carbon interlayer electrode 32A, a cathode active material sheet 38, and metal sulfide catalyst particles 34A. For example, the cathode electrode 30A may be positioned on the cathode current collector 40 made of aluminum foil, nickel foil, or the like.

In example embodiments, the cathode active material sheet 38 may be positioned on the cathode current collector 40, and the porous carbon interlayer electrode 32A may be positioned on the cathode active material sheet 38. The cathode active material sheet 38 may include cathode active material particles 38A that contain sulfur, a conductive material 38B, and a binder 38C. The cathode active material sheet 38 may be formed by, for example, mixing about 60 wt % to about 90 wt % of the cathode active material particles 38A, about 5 wt % to about 20 wt % of the conductive material 38B, and about 5 wt % to about 20 wt % of the binder 38C and compressing the resulting mixture. The conductive material 38B and the binder 38C may be referred to what has been described for the conductive material and the binder with reference to FIG. 2.

The porous carbon interlayer electrode 32A may be positioned on the cathode active material sheet 38, and although not shown in the drawings, the separator 50 (see FIG. 1) may be positioned on the porous carbon interlayer electrode 32A.

The metal sulfide catalyst particles 34A may be uniformly dispersed and positioned on the porous carbon interlayer electrode 32A. The metal sulfide catalyst particles 34A may include, for example, metal disulfides such as tungsten disulfide ($WS_2$), molybdenum disulfide ($MoS_2$), cobalt disulfide ($CoS_2$), titanium disulfide ($TiS_2$), iron disulfide ($FeS_2$), nickel disulfide ($NiS_2$), and the like. For example, in the present embodiment, the metal sulfide catalyst particles 34A may include tungsten disulfide.

The metal sulfide catalyst particles 34A have sulfiphilic surfaces, and thus lithium polysulfide, which is an intermediate product produced by the reaction between sulfur and lithium, may be effectively adsorbed onto surfaces of the metal sulfide catalyst particles 34A. Accordingly, when charging and discharging processes are repeated, dissolution of the lithium polysulfide in an electrolyte and thus loss thereof may be prevented, and a lithium-sulfur battery including the cathode electrode 30A may have excellent high rate characteristics and excellent capacity retention characteristics.

Figure 5:
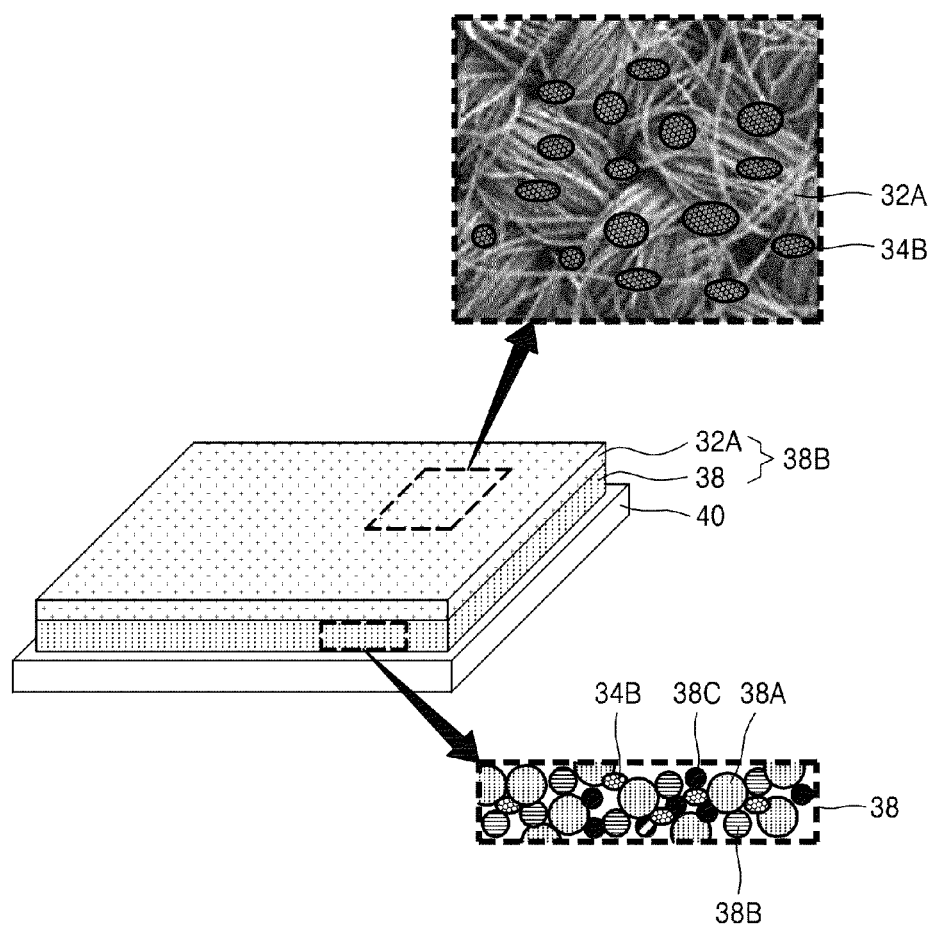
FIG. 5 is a schematic view illustrating a cathode electrode included in a lithium-sulfur battery according to example embodiments.

FIG. 5 is a schematic view illustrating a cathode electrode 30B included in a lithium-sulfur battery according to example embodiments. In FIG. 5, the same reference numerals as those in FIGS. 1 to 4 may denote like elements.

Referring to FIG. 5, metal sulfide catalyst particles 34B may be uniformly dispersed and positioned on upper surfaces of both the porous carbon interlayer electrode 32A and the cathode active material sheet 38.

The metal sulfide catalyst particles 34B have sulfiphilic surfaces, and thus lithium polysulfide, which is an intermediate product produced by the reaction between sulfur and lithium, may be effectively adsorbed onto surfaces of the metal sulfide catalyst particles 34B. In the present embodiment, the metal sulfide catalyst particles 34B may be uniformly dispersed and positioned on both the porous carbon interlayer electrode 32A and the cathode active material sheet 38, and thus, when charging and discharging processes are repeated, dissolution of the lithium polysulfide in an electrolyte and thus loss thereof may be prevented. Accordingly, a lithium-sulfur battery including the cathode electrode 30B may have excellent high rate characteristics and excellent capacity retention characteristics.

Figure 6:
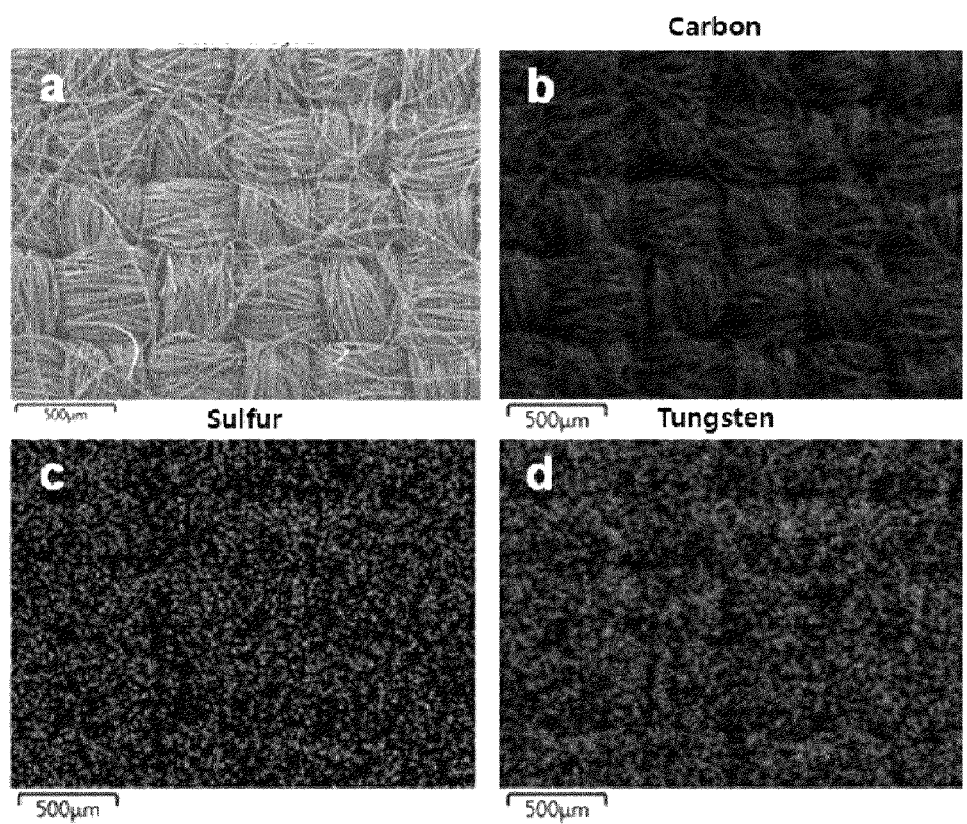
FIG. 6 illustrates a scanning electron microscopy (SEM) image and energy dispersive x-ray spectroscopy (EDS) mapping images of a porous carbon interlayer electrode according to example embodiments.

FIG. 6 illustrates scanning electron microscopy (SEM) images and energy dispersive x-ray spectroscopy (EDS) mapping images of a porous carbon interlayer electrode according to example embodiments.

In FIG. 6, an SEM image acquired using the porous carbon interlayer electrode 32A included in the cathode electrode 30B described with reference to FIG. 5 and EDS mapping images thereof are illustrated. In particular, tungsten disulfide ($WS_2$) was used as the metal sulfide catalyst particles 34B included in the cathode electrode 30B.

FIG. 6A is art SEM image of a porous carbon interlayer electrode. In FIG. 6A, it can be seen that sulfur-containing cathode active material particles and tungsten disulfide catalyst particles are uniformly dispersed and positioned on a porous carbon interlayer electrode in the form of fabric of a plurality of carbon fibers.

FIGS. 6B to 6D are EDS mapping images showing the distribution of sulfur atoms, carbon atoms, and tungsten atoms, respectively. In FIGS. 6B to 6D, it can be confirmed that tungsten atoms and sulfur atoms are uniformly distributed on the porous carbon interlayer electrode. For example, it may be understood that due to high adhesion of tungsten disulfide catalyst particles to the porous carbon interlayer electrode, the tungsten disulfide catalyst particles are uniformly dispersed and present over the entire area of the porous carbon interlayer electrode.

Figure 7:
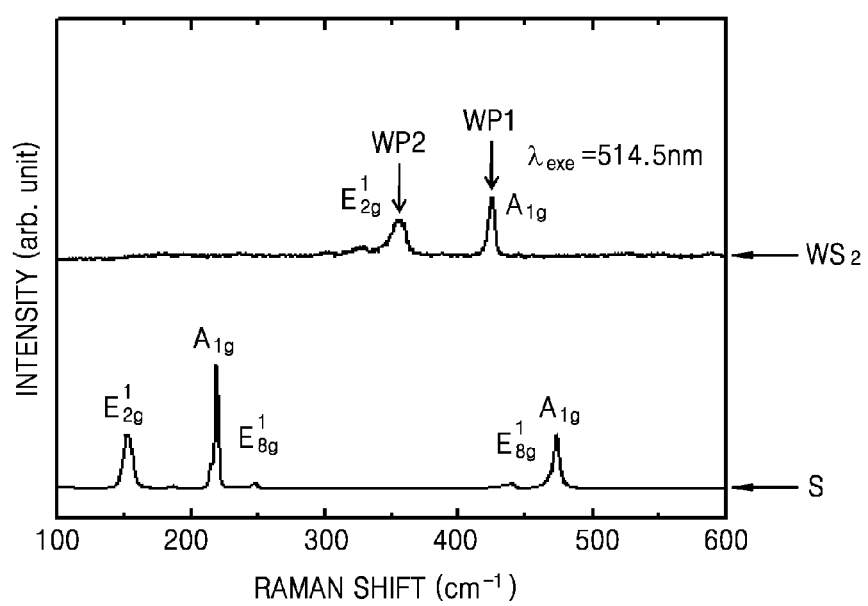
FIG. 7 illustrates Raman scattering spectra of sulfur and tungsten disulfide electrodes according to example embodiments.

FIG. 7 illustrates Raman scattering spectra of sulfur and tungsten disulfide according to example embodiments. In FIG. 7, the Raman scattering spectra of a cathode active material sheet and tungsten disulfide catalyst particles were analyzed using a wavelength of about 514.5 nm.

Referring to FIG. 7, it was confirmed that the tungsten disulfide catalyst particles had a peak WP1 corresponding to $A_{1g}$ vibration having a relatively high intensity and a peak WP2 corresponding to $E^1_{2g}$ vibration having a relatively low intensity. From the result, it can be confirmed that the tungsten disulfide catalyst particles have a two-dimensionally arranged layered structure due to a relative ratio of the peak WP2 corresponding to $E^1_{2g}$ vibration and the peak WP1 corresponding to $A_{1g}$ vibration. For example, it is understood that, since the tungsten disulfide catalyst particles have a two-dimensional layered structure, edge sites of the layered structure may have sulfiphilic properties, and lithium polysulfide, which is an intermediate product produced by the reaction between sulfur and lithium, may be effectively adsorbed onto the edge sites of tungsten disulfide particles.

Figure 8:
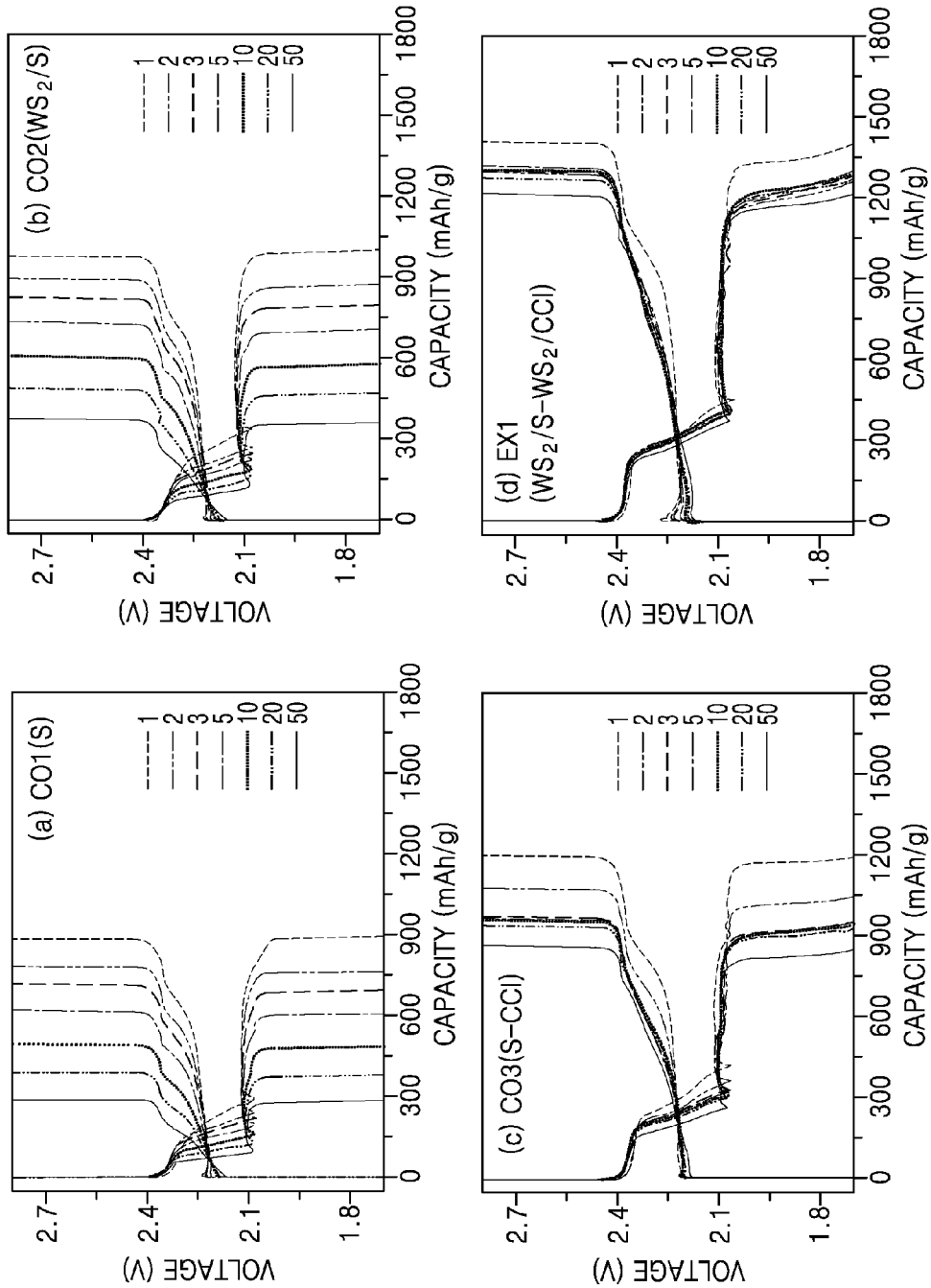
FIG. 8 illustrates graphs showing voltage profiles of cathode electrodes according to comparative examples and an experimental example.
Figure 9:
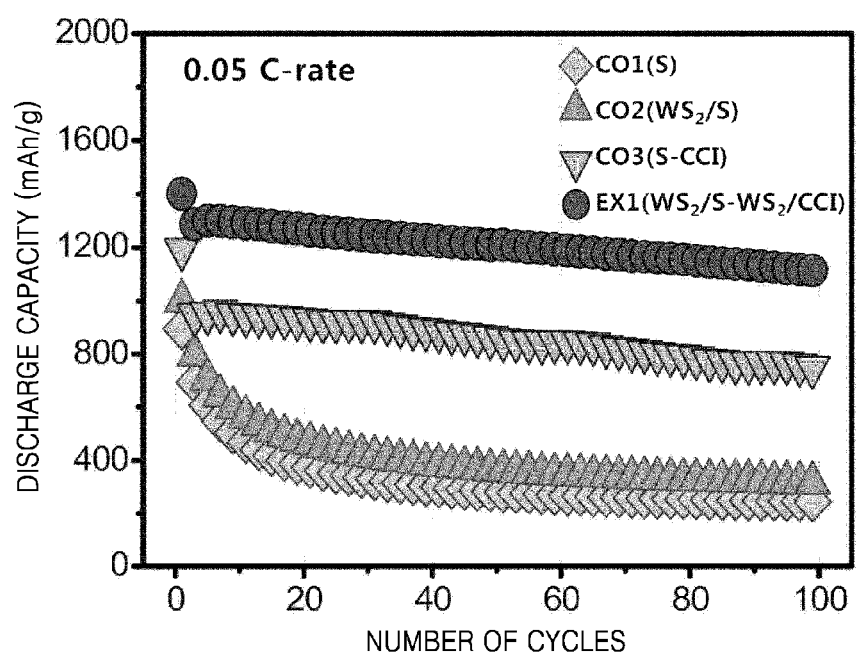
FIG. 9 is a graph showing cycle characteristics of the cathode electrodes according to comparative examples and an experimental example.

FIG. 8 illustrates graphs showing voltage profiles of cathode electrodes according to comparative examples and an experimental example. FIG. 9 is a graph showing cycle characteristics of the cathode electrodes according to comparative examples and an experimental example.

FIGS. 8A, 8B, 8C, and 8D respectively illustrate voltage profiles according to capacity of Comparative Example 1 (CO1), Comparative Example 2 (CO2), Comparative Example 3 (CO3), and Experimental Example 1 (EX1) at $1^{st}$, $2^{nd}$, $3^{rd}$, $5^{th}$, $10^{th}$, $20^{th}$, and $50^{th}$ cycles of charging and discharging. In this case, Comparative Example 1 (CO1) denotes a cathode electrode (S) consisting of a sulfur-containing cathode active material sheet, and Comparative Example 2 (CO2) denotes a cathode electrode ($WS_2$/S) in which tungsten disulfide catalyst particles are dispersed on a sulfur-containing cathode active material sheet. Comparative Example 3 (CO3) denotes a cathode electrode (S-CCI) in which sulfur-containing cathode active material particles are dispersed and positioned on a porous carbon interlayer electrode, and Experimental Example 1 (EX1) denotes a cathode electrode ($WS_2$/S-$WS_2$/CCI) in which tungsten disulfide catalyst particles are dispersed and positioned on both a porous carbon interlayer electrode and a sulfur-containing cathode active material sheet. In FIG. 9, discharge capacities of Comparative Example 1 (CO1), Comparative Example 2 (CO2), Comparative Example 3 (CO3), and Experimental Example 1 (EX1) up to 100 cycles using a discharge rate of 0.05 C are illustrated.

Referring to FIGS. 8 and 9, the cathode electrode (S) according to Comparative Example 1 (CO1) exhibits an initial discharge capacity of about 900 mAh/g, while the cathode electrode ($WS_2$/S-$WS_2$/CCI) according to Experimental Example 1 (EX1) exhibits a high initial discharge capacity, e.g., about 1,454 mAh/g, which corresponds to a significantly higher initial discharge capacity, e.g., about 161.5% than that of Comparative Example 1 (CO1). Comparative Example 2 (CO2, $WS_2$/S) and Comparative Example 3 (CO3, S-CCI) exhibited discharge capacities of about 1,020 mAh/g and about 1,190 mAh/g, from which it can be seen that the cathode electrode ($WS_2$/S-$WS_2$/CCI) according to Experimental Example 1 (EX1) exhibits superior initial discharge capacity than that of each of Comparative Example 2 (CO2) and Comparative Example 3 (CO3).

In the $50^{th}$ cycle of discharging, the cathode electrode (S) according to Comparative Example 1 (CO1) exhibits a discharge capacity of about 290 mAh/g, the cathode electrode ($WS_2$/S) according to Comparative Example 2 (CO2) exhibits a discharge capacity of about 350 mAh/g, the cathode electrode (S-CCI) according to Comparative Example 3 (CO3) exhibits a discharge capacity of about 860 mAh/g, and the cathode electrode ($WS_2$/S-$WS_2$/CCI) according to Experimental Example 1 (EX1) exhibits a discharge capacity of about 1,210 mAh/g. That is, it can be confirmed that the cathode electrode ($WS_2$/S-$WS_2$/CCI) according to Experimental Example 1 (EX1) exhibits a significantly higher discharge capacity at the $50^{th}$ cycle of discharging than that of each of Comparative Examples 1 to 3 (CO1, CO2, and CO3).

As illustrated in FIG. 9, with respect to initial capacity, in 100 cycles of discharging, the cathode electrode (S) according to Comparative Example 1 (CO1) exhibits a capacity retention of about 27.5%, the cathode electrode ($WS_2$/S) according to Comparative Example 2 (CO2) exhibits a capacity retention of about 31.6%, the cathode electrode (S-CCI) according to Comparative Example 3 (CO3) exhibits a capacity retention of about 62.3%, and the cathode electrode ($WS_2$/S-$WS_2$/CCI) according to Experimental Example 1 (EX1) exhibits a capacity retention of about 80.4%. That is, the cathode electrode ($WS_2$/S-$WS_2$/CCI) according to Experimental Example 1 (EX1) exhibited significantly high discharge capacity with respect to initial capacity even after the 100 cycles, from which it can be confirmed that Experimental Example (EX1) exhibits significantly enhanced cycle characteristics as compared to Comparative Examples 1 to 3 (CO1, CO2, and CO3).

Figure 10:
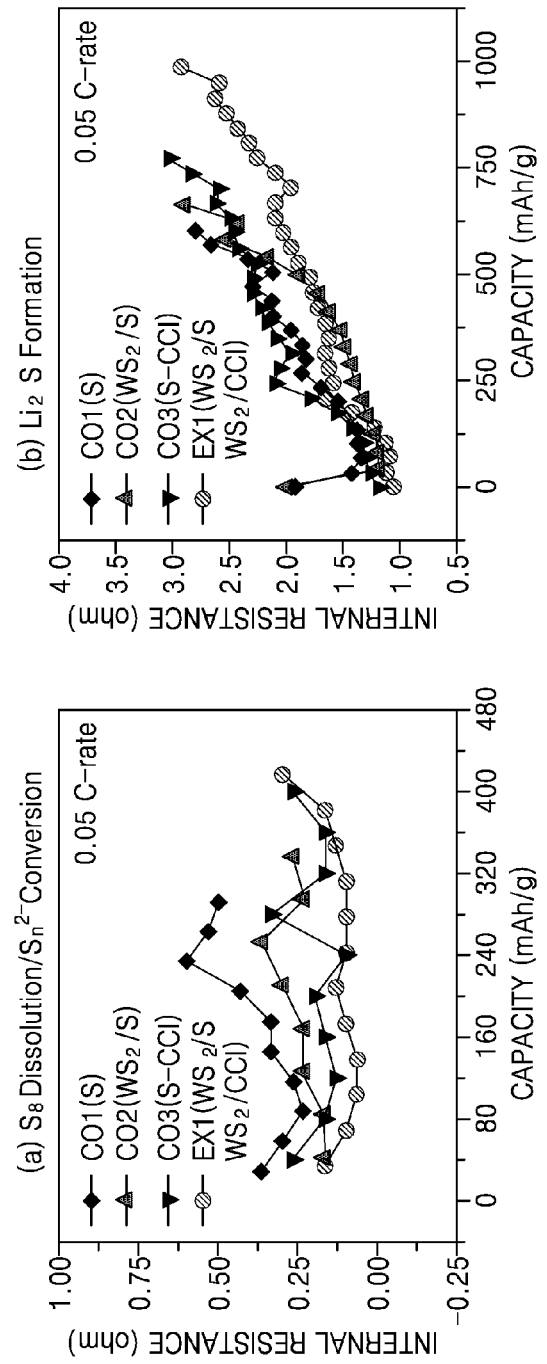
FIG. 10 illustrates graphs showing internal resistances of the cathode electrodes according to comparative examples and an experimental example through a galvanostatic intermittent titration technique.

FIG. 10 illustrates graphs showing internal resistances of the cathode electrodes according to comparative examples and an experimental example. FIG. 10A is a graph showing internal resistances, for example, in conversion of cyclic $S_8$ molecules to $S_n^{2-}$ at the initial stage of discharging (e.g., when a voltage is reduced from 2.8 V to 2.1 V), and FIG. 10B is a graph showing initial resistances in the formation of $Li_2S$ after the middle stage of discharging (e.g., a voltage range lower than 2.1 V).

Referring to FIG. 10A, it can be confirmed that, at the initial stage of discharging (e.g., when a voltage is reduced from 2.8 V to 2.1 V), Experimental Example 1 (EX1) has lower internal resistance than that of each of Comparative Examples 1 to 3 (CO1, CO2, and CO3). In particular, it may be understood that the cases of Comparative Example 3 (CO3, S-CCI) and Experimental Example 1 (EX1, $WS_2$/S-$WS_2$/CCI) that include a porous carbon interlayer electrode exhibit lower initial resistances than those of Comparative Example 1 (CO1, S) and Comparative Example 2 (CO2, $WS_2$/S) due to high charge transfer characteristics of the porous carbon interlayer electrode.

Referring to FIG. 10B, it can be confirmed that, after the middle stage of discharging (e.g., a voltage range lower than 2.1 V), Experimental Example 1 exhibits overall lower internal resistance than that of each of Comparative Examples 1 to 3. In particular, it may be understood that, although initial resistance was further increased compared to the case illustrated in FIG. 10A due to loss of active sites of a cathode active material, the cases of Comparative Example 2 (CO2, $WS_2$/S) and Experimental Example 1 (EX1, $WS_2$/S-$WS_2$/CCI) that include tungsten disulfide exhibit lower internal resistances than those of Comparative Example 1 (CO1, S) and Comparative Example 3 (CO3, S-CCI), due to catalyst effects by the tungsten disulfide.

Figure 11:
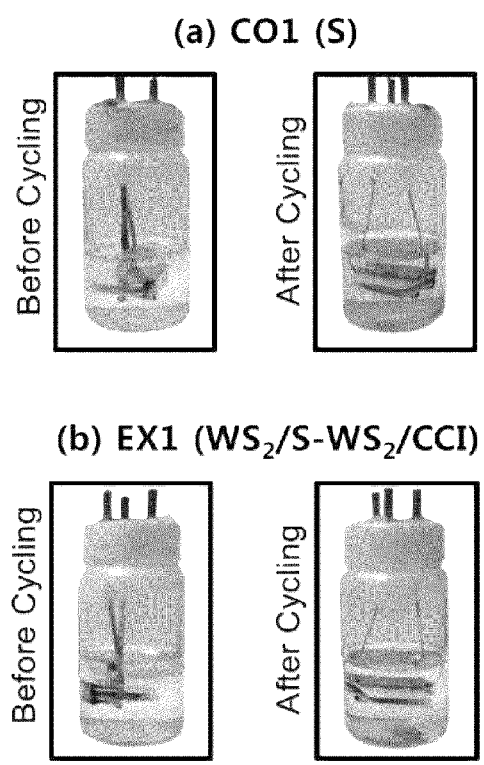
FIG. 11 illustrates images showing changes in color of electrolytes before and after cycling of the cathode electrodes according to comparative examples and an experimental example.

FIG. 11 illustrates images showing changes in color of electrolytes before and after cycling of the cathode electrodes according to comparative examples and an experimental example. In FIG. 11A, a vial bottle-type battery including the cathode electrode (S) according to Comparative Example 1 (CO1) and an electrolyte was fabricated, and then a color of the electrolyte before and after cycling was observed. In FIG. 11B, a vial bottle-type battery including the cathode electrode ($WS_2$/S-$WS_2$/CCI) according to Experimental Example 1 (EX1) and an electrolyte was fabricated, and then a color of the electrolyte before and after cycling was observed.

Referring to FIG. 11A, the electrolyte in which the cathode electrode (S) according to Comparative Example 1 (CO1) was immersed was colorless (i.e., transparent electrolyte) before cycling, while turning yellow after cycling. It may be understood that this is because sulfur-containing cathode active material particles are dissolved in the electrolyte in a cycling process. In addition, although not shown in the drawing, according to UV-visible light spectral analysis of the electrolyte after cycling, the electrolyte after cycling absorbed light in a blue wavelength band, from which it may be assumed that lithium polysulfide is present in the electrolyte after cycling.

Referring to FIG. 11B, the electrolyte in which the cathode electrode ($WS_2$/S—$WS_2$/CCI) according to Experimental Example 1 (EX1) was immersed was colorless (i.e., transparent electrolyte) both before and after cycling. Unlike the case of Comparative Example 1 (CO1), according to Experimental Example 1 (EX1), it may be understood that this is because sulfur-containing cathode active material particles are not dissolved in the electrolyte even after cycling. In addition, although not shown in the drawing, according to UV-visible light spectral analysis of the electrolyte after cycling, the electrolyte after cycling did not absorb light in a blue wavelength band, from which it may be assumed that lithium polysulfide is not present in the electrolyte after cycling.

Figure 12:
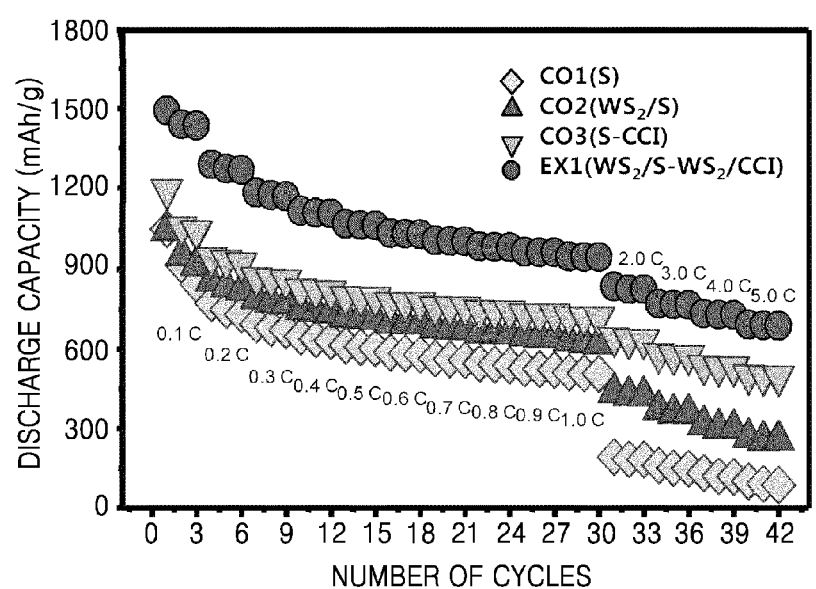
FIG. 12 is a graph showing high rate discharge characteristics of the cathode electrodes according to comparative examples and an experimental example.

FIG. 12 is a graph showing high rate discharge characteristics of the cathode electrodes according to comparative examples and an experimental example.

Referring to FIG. 12, the cathode electrode ($WS_2$/S-$WS_2$/CCI) according to Experimental Example 1 (EX1) exhibits excellent discharge capacity even at various discharge rates of 0.1 C to 5.0 C. That is, excellent electron transfer properties are achieved by the porous carbon interlayer electrode, and the dissolution of cathode active material particles in the electrolyte is prevented by tungsten disulfide catalyst particles, and thus the cathode electrode ($WS_2$/S-$WS_2$/CCI) according to Experimental Example 1 (EX1) may exhibit excellent electrochemical performance even at a high discharge rate.

According to the electrochemical characteristics of the experimental example of the present disclosure described above with reference to FIGS. 6 to 12, a cathode electrode according to an example embodiment of the present disclosure, in which metal sulfide catalyst particles are dispersed on a porous carbon interlayer electrode, may exhibit significantly high discharge capacity, excellent cycle characteristics, and enhanced high rate discharge characteristics. This may be because not only the porous carbon interlayer electrode acts as a path for rapid electron transfer, but also acts as a physical barrier that prevent cathode active material particles from being dissolved in an electrolyte, due to sulfiphilic properties of metal sulfide catalyst particles.

As is apparent from the foregoing description, in a lithium-sulfur battery according to the present disclosure, tungsten-containing metal sulfide catalyst particles and sulfur-containing cathode active material particles may be dispersed and located on a porous carbon interlayer electrode. The porous carbon interlayer electrode may enable physical protection of a cathode material through a cathode current collector and rapid electron exchange, and the tungsten-containing metal sulfide catalyst particles may increase affinity between sulfur and the porous carbon interlayer electrode, and thus enables the sulfur-containing cathode active material particles to be strongly or rigidly attached to the porous carbon interlayer electrode. Accordingly, the lithium-sulfur battery may exhibit excellent Coulombic efficiency and excellent capacity retention characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A lithium-sulfur secondary battery comprising:
a cathode current collector; and
a cathode electrode on the cathode current collector,
wherein the cathode electrode comprises:
a cathode active material sheet including sulfur-based active material particles including sulfur, a binder, and a conductive material,
a porous carbon interlayer electrode including a plurality of carbon fibers,
metal sulfide catalyst particles dispersed and positioned on the porous carbon interlayer electrode,
wherein the metal sulfide catalyst particles are also dispersed on the cathode active material sheet,
wherein the metal sulfide catalyst particles comprise tungsten disulfide ($WS_2$).

2. The lithium-sulfur secondary battery of claim 1, wherein the metal sulfide catalyst particles have sulfiphilic surfaces.

3. The lithium-sulfur secondary battery of claim 1, wherein the porous carbon interlayer electrode comprises at least one selected from the group consisting of carbon fiber fabric, carbon fiber cloth, and carbon non-woven fabric.

4. The lithium-sulfur secondary battery of claim 1, wherein the metal sulfide catalyst particles have an average diameter of about 1 nm to about 100 µm.

5. The lithium-sulfur secondary battery of claim 1, wherein the sulfur-based active material particles have an average diameter of 100 nm to 10 µm.

6. The lithium-sulfur secondary battery of claim 1, wherein the metal sulfide catalyst particles prevent dissolution of the sulfur-based active material particles from the cathode electrode.

7. A lithium-sulfur secondary battery comprising:
a cathode current collector;
a cathode electrode on the cathode current collector,
wherein the cathode electrode comprises:
a cathode active material sheet including sulfur-based active material particles including sulfur, a binder, and a conductive material,
a carbon interlayer electrode comprising a plurality of carbon fibers, and
metal sulfide catalyst particles dispersed and positioned on the carbon interlayer electrode and comprising tungsten;
an anode current collector;
an anode electrode positioned on the anode current collector and comprising lithium;
a separator located between the anode electrode and the cathode electrode; and
an electrolyte allowing the separator to be immersed therein and being in contact with a surface of the cathode electrode,
wherein the metal sulfide catalyst particles are also dispersed and positioned on the cathode active material sheet,
wherein the metal sulfide catalyst particles comprise tungsten disulfide ($WS_2$).

8. The lithium-sulfur secondary battery of claim 7, the metal sulfide catalyst particles have sulfiphilic surfaces.

9. The lithium-sulfur secondary battery of claim 7, wherein the metal sulfide catalyst particles prevent the sulfur-based active material particles from being dissolved in the electrolyte from the cathode electrode.

10. The lithium-sulfur secondary battery of claim 7, wherein the metal sulfide catalyst particles have an average diameter of 1 nm to 100 µm.

11. The lithium-sulfur secondary battery of claim 7, the sulfur-based active material particles have an average diameter of 100 nm to 10 µm.

* * * * *